United States Patent
Oxley

(12) 
(10) Patent No.: US 8,469,322 B1
(45) Date of Patent: Jun. 25, 2013

(54) SYSTEM FOR DISPLAYING A STRAND OF LIGHTS ON A STRUCTURE

(76) Inventor: Randy Oxley, Swisher, IA (US)

(*) Notice: Subject to any disclaimer, the term of this patent is extended or adjusted under 35 U.S.C. 154(b) by 98 days.

(21) Appl. No.: 13/103,751

(22) Filed: May 9, 2011

(51) Int. Cl.
- F16L 3/08 (2006.01)
- F21S 4/00 (2006.01)
- F21S 8/00 (2006.01)

(52) U.S. Cl.
USPC .. 248/74.2; 248/316.7; 248/237; 362/249.01; 362/147; 362/396

(58) Field of Classification Search
USPC ............... 248/237, 205.1, 48.1, 48.2, 316.7, 248/214, 74.2; 174/135; 362/396, 249.01, 362/145, 147, 151, 152, 806; 52/11, 12, 15, 52/28
See application file for complete search history.

(56) References Cited

U.S. PATENT DOCUMENTS

| | | | |
|---|---|---|---|
| 5,092,086 A * | 3/1992 | Rognsvoog, Sr. | 52/12 |
| 5,581,956 A * | 12/1996 | Fennessy et al. | 248/237 |
| 6,076,938 A * | 6/2000 | Kinderman | 362/145 |
| 6,352,291 B1 * | 3/2002 | Tortajada | 294/24 |
| 6,971,768 B1 * | 12/2005 | Pepito et al. | 362/238 |
| 7,926,777 B2 * | 4/2011 | Koesema, Jr. | 248/316.7 |
| 8,152,112 B2 * | 4/2012 | Miller et al. | 248/48.1 |
| 2006/0152927 A1 * | 7/2006 | Vendrick | 362/249 |
| 2010/0118554 A1 * | 5/2010 | Kraus et al. | 362/396 |
| 2012/0198680 A1 * | 8/2012 | Durben et al. | 29/428 |

* cited by examiner

*Primary Examiner* — Tan Le
(74) *Attorney, Agent, or Firm* — Brett D. Papendick; Shuttleworth & Ingersoll, PLC

(57) ABSTRACT

A system for displaying a strand of lights on a residence or building using an elongated member which attaches to a standard gutter or an eave of the building. The member can be made of metal and has a number of spaced apart hooks for securing a portion of the strand of lights. The system can include a plurality of vertically spaced clips located on a downspout or other structure of the building which secure a portion of the strand of lights or an electric wire such as an extension cord. Additionally, a mesh gutter guard can be utilized with the system and attached to the elongated member. The guard spans the width of the gutter and can be tucked under the drip edge of the roof or under shingles.

17 Claims, 6 Drawing Sheets

SYSTEM FOR DISPLAYING A STRAND OF LIGHTS ON A STRUCTURE

BACKGROUND

The ability to efficiently and effectively hang and remove holiday lights is important, particularly in the northern states where the elements of snow and ice make the practice hazardous. Typically a person must utilize a ladder and/or climb on the roof to hang holiday lights. This is the case even when some type of attachment mechanisms are already on some structure of the house. Moreover, current attachment mechanisms only provide support in the horizontal direction.

Additionally, a variety of gutter protection systems have been utilized to minimize the amount of debris entering the body of gutters on a house. These systems often include a covering for the gutter. The current systems, however, do little to protect the edge of the gutter from discoloration. Furthermore, the covers are inefficient at directing water into the body of the gutter.

It is therefore an object of the invention to provide a system for hanging and supporting a strand of lights on a house in both the vertical and horizontal directions.

It is a further object of the invention to provide a system for preventing debris from entering the body of a gutter.

It is yet another object of the invention to protect the gutter from discoloration.

It is still another object of the invention to provide a tool for hanging and removing a strand of lights while remaining on the ground.

SUMMARY OF THE INVENTION

A system for effectively positioning, maintaining and organizing a strand of lights in conjunction with a gutter of a typical home allows a user from the ground to construct or remove the strand of lights from the ground. The system utilizes an elongated member made of metal in conjunction with a mesh gutter guard. The elongated member rests over a portion of a typical gutter of a house, creating a drip edge. The guard covers the open portion of the gutter and keeps debris from entering the gutters and downspouts.

The elongated member includes attachment members such as hooks on one edge of the elongated member. The hooks allow a wire or strand of lights to be held in place horizontally for the length of the gutter. The lights can be holiday lights which are typically hung during the winter holiday season. The hooks include an opening with a sufficient space to easily insert and remove the strand of lights.

In order to control the wire or strand of lights in the vertical direction, the system uses a series of clips. The clips have a flat, first portion which can be attached to a downspout or other structure of the house. A number of segments extend from the first portion, which creates a space for the strand of lights. Each clip can be attached to the house in a first configuration or a second configuration. A clip can be manipulated from the first configuration to the second configuration, and vice versa, by rotating the clip one hundred and eighty degrees. For best control of the strand of lights, an alternating pattern of first and second configurations is used for the length of the downspout.

A tool can be used with the system to hang the strand of lights in both the vertical and horizontal directions. Additionally, the tool can be connected to a pole which allows the user to reach the roof line of a house while remaining on the ground. The user manipulates the strand with the tool and places the strand of lights within the openings of the hooks and/or clips. Furthermore, the tool is shaped such that it can be utilized to manipulate the size of the opening of the hooks.

DETAILED DESCRIPTION

Figure 1:
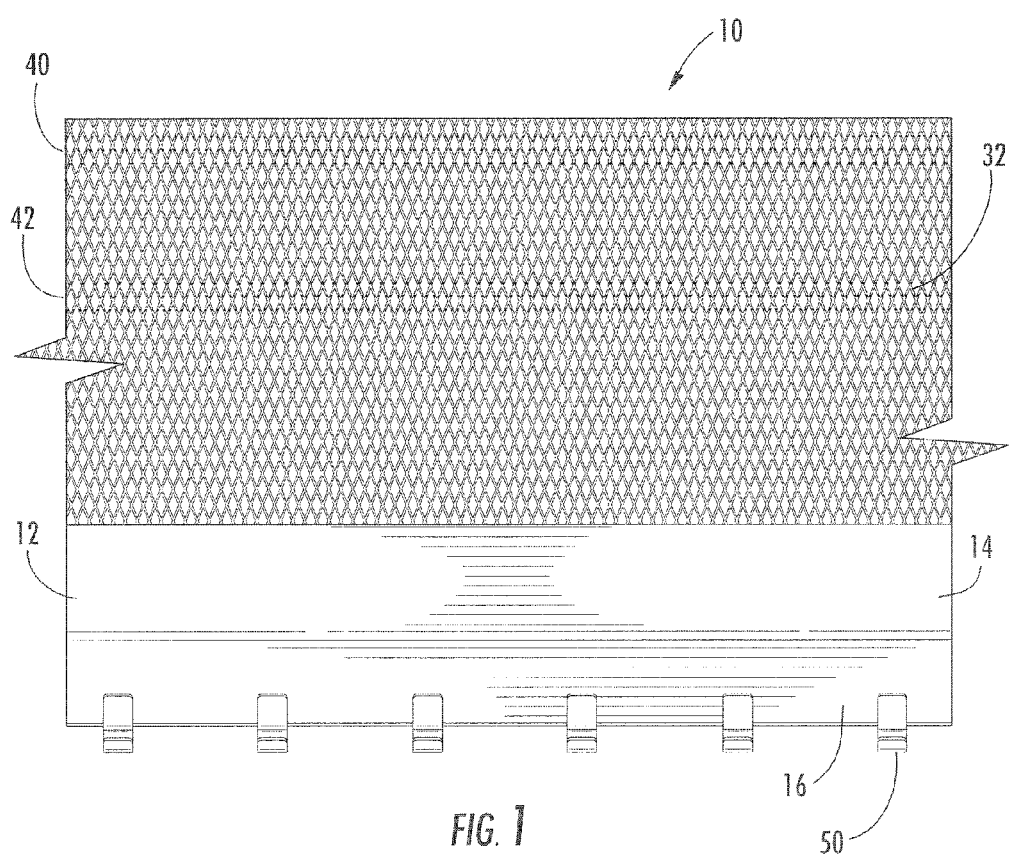
FIG. 1 is a top view of the present invention showing the elongated member, gutter guard and attachment mechanisms.
Figure 2:
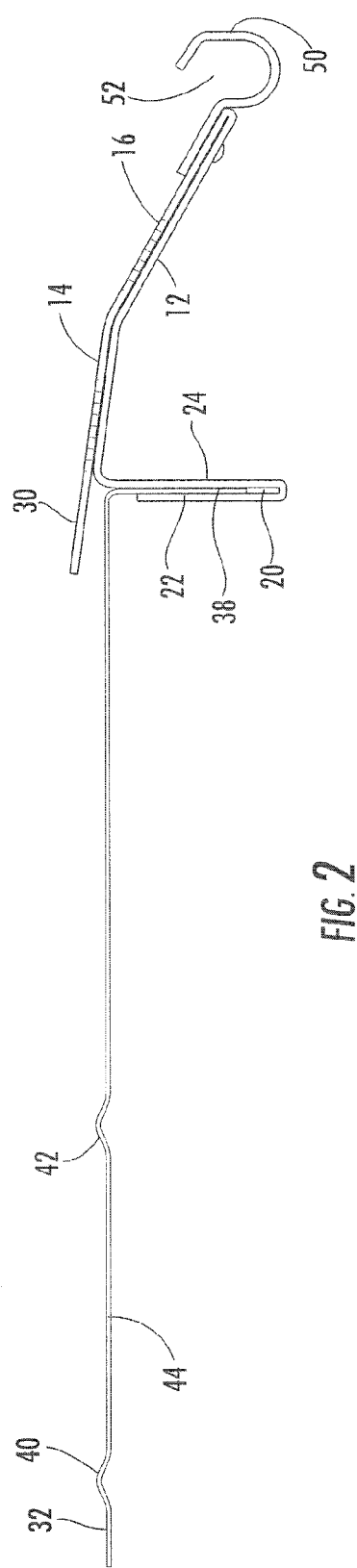
FIG. 2 is side view of the present invention.
Figure 3:
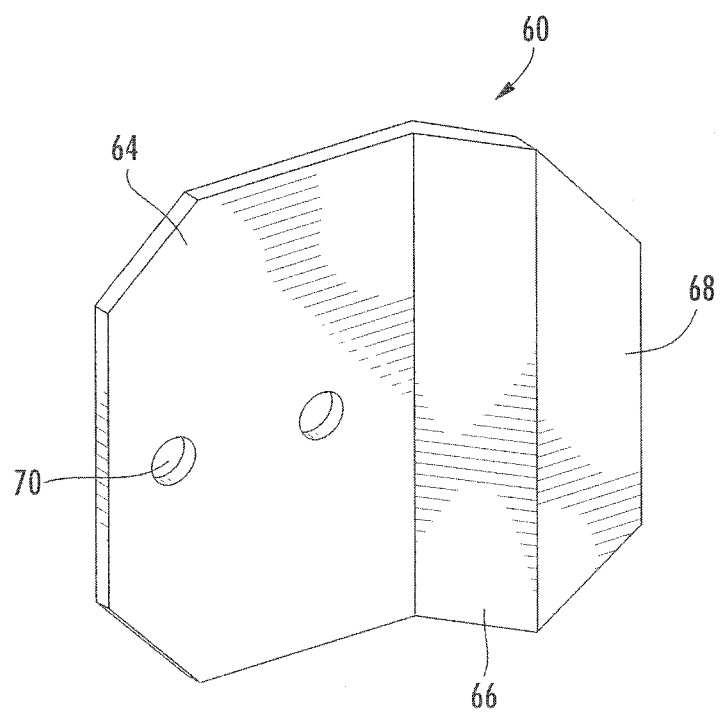
FIG. 3 is perspective view of a clip.
Figure 4:
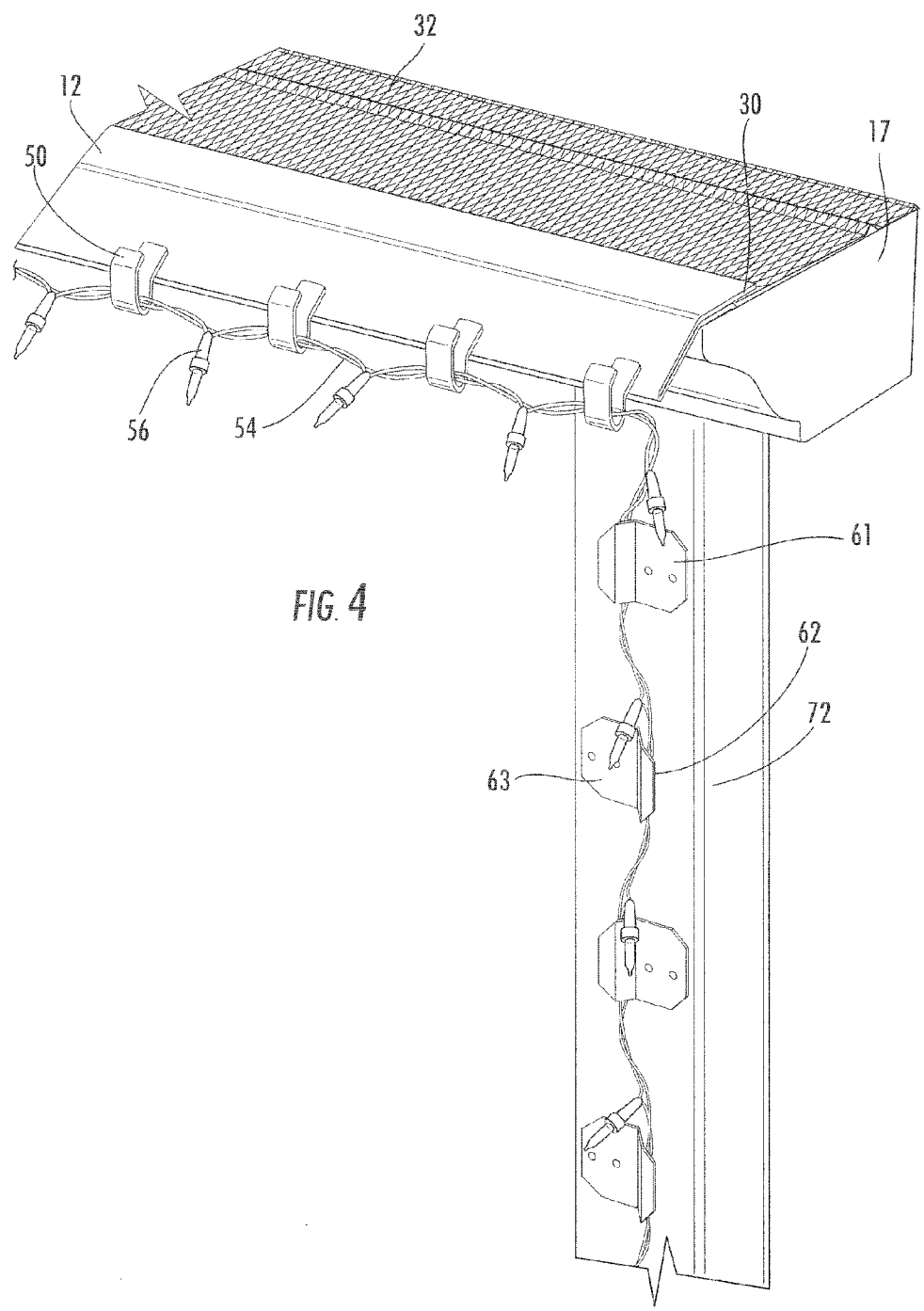
FIG. 4 shows the system on a house.

Now referring to the drawings, FIGS. 1 and 2 show a portion of a system 10 for displaying a strand of lights from a structure such as a residential or commercial building. The system 10 includes an elongated member 12 preferably made of a metal such as aluminum or steel, although a variety of materials can be utilized. As seen in FIG. 4, the elongated member 12 can be attached or connected to the gutter system of a new or existing house.

The elongated member 12 preferably includes a first section 14 and a second section 16. The first section 14 is substantially planar. The second section 16 extends from the first section 14. The second section 16 forms an angle in relation to the first section 14. Generally the first section 16 has a more horizontal position than the second section 16. This positioning allows rain water or other liquids to drain from the elongated member 12 and not puddle or remain on the member 12.

The elongated member 12 includes a flange 20 depending from the elongated member 12. Preferably, the flange 20 is located beneath the first section 14 and is substantially perpendicular to the first section 14. The flange 20 has a first side 22 and a second side 24 with a space 38 formed between the first side 22 and second side 24. When the elongated member 12 is positioned on a gutter or another structure of a roof, such as a gable, soffit or fascia board, the second side 24 of the flange 20 abuts against the gutter or other roof structure. If the elongated member 12 is attached to a gutter, the flange 20 makes contact with a surface of the gutter facing the building. Such contact will at least partially secure the elongated member 12 to the gutter and building. Alternatively, if the elongated member is to be attached directly to a structure such as an eave or fascia board, the first side 20 can be positioned against the eave or fascia. A portion of the first section 14 of the elongated member 12 shown as a lip 30 will extend over the depending flange 20.

Figure 6:
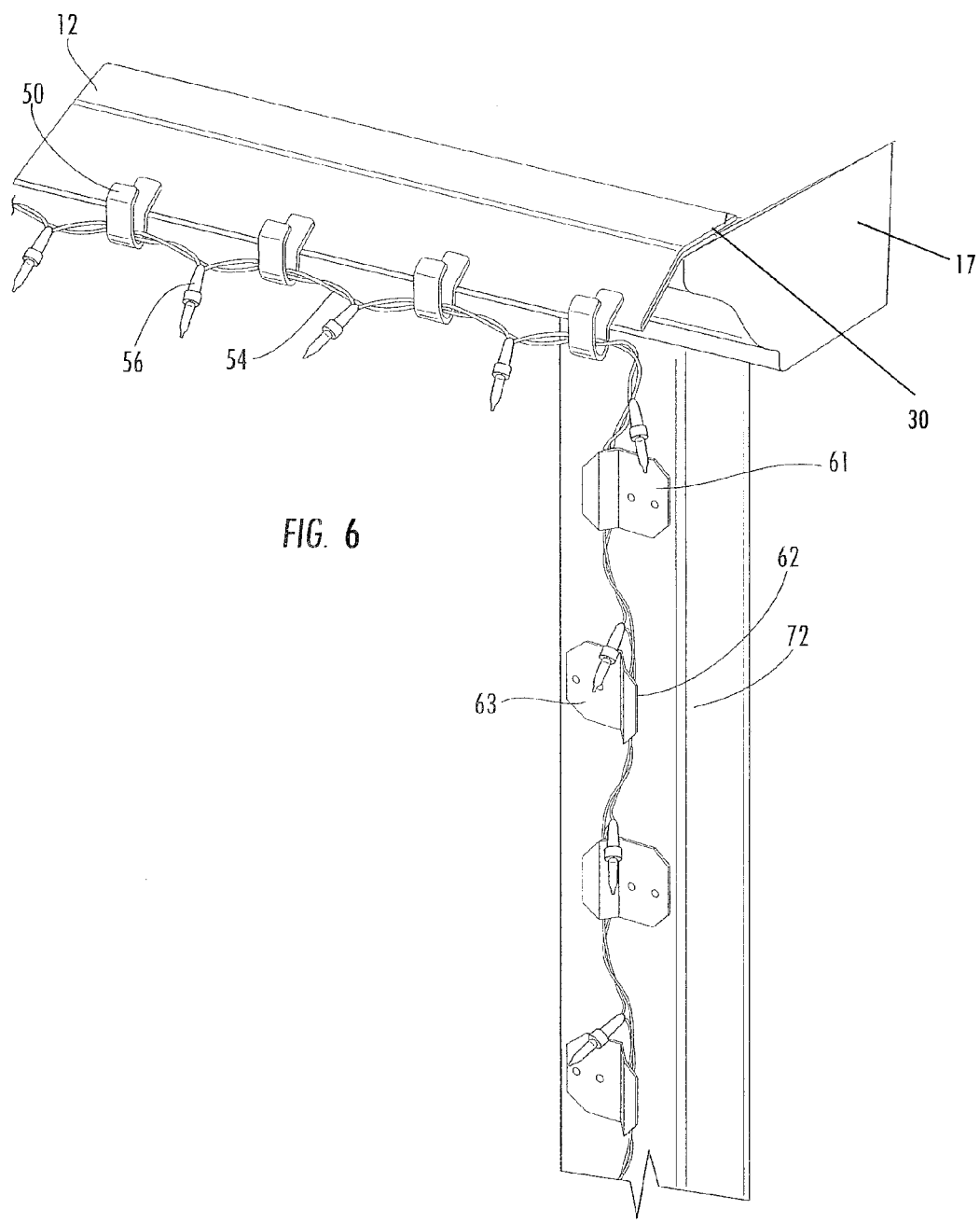
FIG. 6 is a perspective view of an alternate embodiment of the invention.

The preferred embodiment also includes a gutter guard 32 with a first end 34 and a second end 36, although the gutter guard can be omitted in other embodiments as shown in FIG. 6. The gutter guard 32 is made of a material which will allow liquid to enter into a standard gutter of a house or other structure. The preferred embodiment has a gutter guard 32 made of a wire mesh. The mesh contains opening which allow liquids to pass through it and into the gutter, while preventing solids such as leaves and other debris from entering the gutter. The first end 34 can be positioned within the space 38. As the flange 20 is preferably made of a malleable metal, the flange 20 can be adjusted such that the first end 34 is held securely in place by the first side 22 and second side 24 of the flange 20. The second end 36 can be secured to a part of a house, preferably under a portion of a shingle or a drip edge of the house. This configuration allows water to better flow into and over the gutter guard 32 and into the gutter of the house.

Additionally, the gutter guard 32 includes two ridges 40 and 42 which create a channel 44 between them. Additional ridges can be used to form additional channels and/or used to assist in connecting the guard to structure of the system or house. A portion of the top back edge of the gutter can be fitted in or under the channel 40 such that water from the roof will first enter through the channel 44. The second ridge 42 keeps a greater amount of water within the channel 44 as the water exits from the roof. This increases the probability that water enters the body of the gutter and does not roll over the edge of the system 10. In addition to the ridges 40 and 42 directing the water, the elongated member 12 is positioned such that it overhangs the front wall of the gutter. The positioning of member 12 allows any water that rolls off of the member 12 to clear the front edge of the gutter. Since the water does not hit the front wall of the gutter, the chance of uneven discoloration on the gutter is prevented along with increasing the life of the gutter.

The system 10 also includes plurality of attachment members 50 on the elongated member 12, preferably on the second section 16. The attachment members 50 can be a variety of shapes and sizes, preferably the attachment members 50 are hooks that have an opening 52. The opening 52 is a size which allows a person to manipulate a portion of an insulated wire 54 within the opening 52 of each attachment member 50. The process is repeated such that the wire 54 hangs the length of the system 10. The wire 54 is preferably a strand of lights 56 used for decoration of a house or similar structure.

The attachment members 50 secure the strand of lights 56 in the horizontal direction, while a series of clips 60 secure the wire 54 or strand 56 in the vertical direction. Each clip 60 is shaped such that the clip 60 forms a cavity 62 in which a portion of the strand 56 or wire 54 is found. The preferred embodiment of the clip 60 has a first segment 64 which is substantially planar, a second segment 66 extending at an angle to the first segment 64, and a third segment 68 extending from the second segment 66. The third segment 68 is substantially parallel to the first segment 64. The first segment 64 also includes at least one hole 70. A fastening device (not shown) can be inserted through each hole 70 to secure the clip to a structure of a house or similar structure.

Referring to FIG. 4, a first clip 61 is secured to the structure in a first configuration wherein the first segment 64 is flush with a structure of the house, which can be a downspout 72. The first configuration is such that the second segment 66 and third segment 68 are positioned to the left of the first segment 64. A second clip 63 is secured to the structure in a second configuration wherein the first segment 64 is flush with the structure. The second configuration is such that the second segment 66 and the third segment 68 are positioned to the right of the first segment 64. The second configuration can be achieved from the first configuration, and vice versa, simply by rotating the clip one-hundred and eighty degrees. The second clip 63 is spaced a distance vertically apart from the first clip 61. Additional clips can be added in the vertical direction up and down the structure. The wire 54 or strand of lights 56 can be manipulated to fit within the cavities 62 of the clips 60 as seen in FIG. 4. The preferred alternating arrangement of the clips 60 between the first configuration and second configuration minimize the chances that forces such as the wind will dislodge the wire 54 or strand of lights 56 from the cavities 62. The size of the cavities 62 along with the shape of the clips 60 allow for easy installation and removal of the wire 54 or strand of lights 56.

Figure 5:
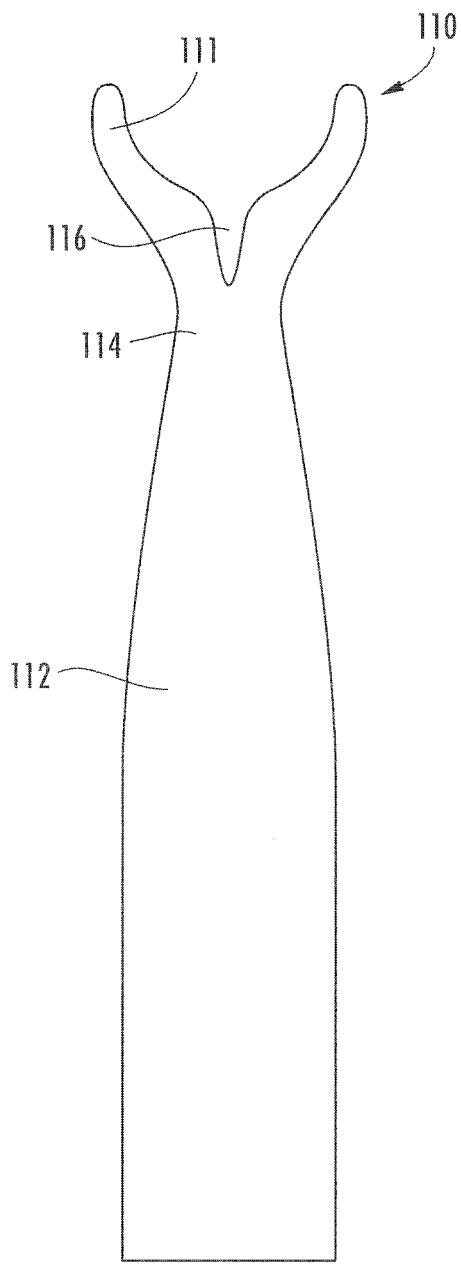
FIG. 5 is a front view of a tool to position a wire or strand of lights.

Now referring to FIG. 5, a tool 110 is shown which allows a user to effectively position the wire 54 or strand of lights 56 within the openings 52 and the cavities 62 while remaining on the ground. The tool 110 includes prongs 111 which form a Y-shaped structure at a first end 114. The two prongs 111 converge and narrow to form a slot 116. The wire 54 or strand of lights can be positioned within the slot 116. An extension pole 112 allows the user to elevate the tool 110 until reaching one of the openings 52. The wire 54 or strand of lights 56 is positioned and the process can then be repeated for additional openings 52 until the entire wire 54 or strand of lights 56 is positioned. The tool 110 can also be used to remove the wire 54 or strand of lights 56 from the openings 52 and strand of lights 56. A user manipulates the tool 110 such that the slot 116 makes contact with one of the attachment members 50 in a closed position. Once the member 50 is secured in slot 116, the user can then pry open the attachment member 50, allowing the wire 54 or strand of lights 56 to be removed from the attachment member 50. The process can be repeated for other closed attachment members 50. Furthermore, the overall shape of the tool 110 allows a user standing on the ground to manipulate the attachment members 50 such that the size of the openings 52 can be reduced to further secure the wire 54 or strand of lights 56. The user can then use the tool 110 to further manipulate the members 50 to increase the size of the openings 52 when the wire 54 or strand of lights 56 needs to be removed.

Having thus described the invention in connection with the several embodiments thereof, it will be evident to those skilled in the art that various revisions can be made to the several embodiments described herein with out departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments.

What is claimed is:

1. A system for displaying a strand of lights on a structure, comprising:
    an elongated member,
    the elongated member capable of connecting to at least one of a gutter and a roof structure;
    a plurality of attachment mechanisms along the elongated member;
    the attachment mechanisms holding a portion of the strand of lights;
    the elongated member has a first section,
    the first section is substantially planar;
    the elongated member has a second section;
    the second section forming an angle to the first section;
    at least a portion of the attachment mechanisms are hooks;
    a flange depending from the first section;
    the flange abutting at least one of the gutter and roof structure, thereby further securing the elongated member.

2. The system of claim 1, wherein:
    the first section, second section and flange are one piece.

3. The system of claim 2, wherein:
    the second section extends over at least one of the gutter and roof structure to serve as a drip edge.

4. The system of claim 3, further comprising:
    at least one clip for at least partially securing at least one of the strand of lights and a wire;
    the clip attached to at least one of a downspout and side of a building.

5. The system of claim 4, wherein:
the clip has a first segment;
the clip has a second segment extending from the first segment;
the second segment is at an angle to the first segment.

6. The system of claim 5, wherein:
the clip has a third segment extending from the second segment;
the third segment substantially parallel with the first segment;
the first segment having a first and second surface.

7. The system of claim 6, wherein:
a first clip is attached to at least one of the downspout and side of the building;
the first surface of the first clip is in contact with the at least one of the downspout and the side of the building to form a first configuration;
a second clip is attached to at least one of the downspout and the side of the building;
the first surface of the second clip is in contact with at least one of the downspout and the side of the building to form a second configuration.

8. The system of claim 7, wherein:
the first clip and the second clip are placed vertically apart from one another;
additional clips are attached to at least one of the downspout and the side of the building, alternating from the first configuration to the second configuration.

9. The system of claim 8, further comprising:
a guard attached to the elongated member;
the guard covering at least a portion of an open top end of the gutter;
the guard made of a mesh material which allows water to enter the gutter.

10. A system for displaying a strand of lights on a structure, comprising:
an elongated member;
the elongated member having a first section;
the elongated member having a second section;
the second section forming an angle with the first section;
a plurality of attachment mechanisms on the elongated member which secure a portion of the strand of lights;
a flange depending from the elongated member;
the flange abutting at least one of a gutter wall and a roof structure;
at least a portion of the second section extends over at least one of the gutter wall and the roof structure;
at least one clip for at least partially securing at least one of the strand of lights and a wire;
the clip attached to at least one of a downspout and a side of a building.

11. The system of claim 10, wherein:
the clip has a first segment;
the clip has a second segment extending from the first segment;
the second segment is at an angle to the first segment.

12. They system of claim 11, wherein:
the clip has a third segment extending from the second segment;
the third segment substantially parallel with the first segment;
the first segment having a first and second surface;
a first clip is attached to at least one of the downspout and side of the building;
the first surface of the first clip is in contact with the at least one of the downspout and the side of the building to form a first configuration;
a second clip is attached to at least one of the downspout and the side of the building;
the first surface of the second clip is in contact with at least one of the downspout and the side of the building to form a second configuration.

13. The system of claim 12, wherein:
the first clip and the second clip are placed vertically apart from one another;
additional clips are attached to at least one of the downspout and the side of the building, alternating from the first configuration to the second configuration.

14. The system of claim 13, further comprising:
a guard attached to the elongated member;
the guard covering at least a portion of an open top end of the gutter;
the guard made of a mesh material which allows water to enter the gutter.

15. The system of claim 1, further comprising:
a guard attached to the elongated member;
the guard covering at least a portion of an open top end of the gutter;
the guard made of a mesh material which allows water to enter the gutter.

16. The system of claim 10, further comprising:
a guard attached to the elongated member;
the guard covering at least a portion of an open top end of the gutter;
the guard made of a mesh material which allows water to enter the gutter.

17. The system of claim 15, wherein:
the guard comprises a first ridge and a second ridge;
a channel between the first ridge and second ridge for directing water into the gutter.

* * * * *